United States Patent
Gray et al.

(10) Patent No.: US 9,313,937 B2
(45) Date of Patent: Apr. 19, 2016

(54) APPARATUS AND METHOD FOR SOIL TILLAGE AND LEVELLING

(71) Applicant: Salford Group Inc., Salford (CA)

(72) Inventors: Geof J. Gray, Burford (CA); Jacobus A. Rozendaal, Salford (CA); John Mark Averink, Norwich (CA); Simon Goveia, Gladstone (CA)

(*) Notice: Subject to any disclaimer, the term of this patent is extended or adjusted under 35 U.S.C. 154(b) by 0 days.

(21) Appl. No.: 14/803,499

(22) Filed: Jul. 20, 2015

(65) Prior Publication Data

US 2015/0319910 A1  Nov. 12, 2015

Related U.S. Application Data

(63) Continuation of application No. 13/840,996, filed on Mar. 15, 2013.

(51) Int. Cl.
*A01B 5/08* (2006.01)
*A01B 21/08* (2006.01)

(52) U.S. Cl.
CPC .............. *A01B 5/08* (2013.01); *A01B 21/083* (2013.01)

(58) Field of Classification Search
CPC ........ A01B 49/02; A01B 49/027; A01B 5/08; A01B 21/086; A01B 21/083
See application file for complete search history.

(56) References Cited

U.S. PATENT DOCUMENTS

| | | | |
|---|---|---|---|
| 1,380,441 A * | 6/1921 | Truman | A01B 21/083 172/594 |
| 2,558,890 A | 7/1951 | White | |
| 3,675,725 A | 7/1972 | Schultz | |
| 4,245,706 A * | 1/1981 | Dietrich, Sr. | A01B 49/02 172/180 |
| 4,366,760 A | 1/1983 | Dreyer | |
| 4,403,662 A | 9/1983 | Dietrich, Sr. | |
| 4,538,689 A | 9/1985 | Dietrich, Sr. | |
| 4,542,793 A | 9/1985 | Dietrich, Sr. | |
| 5,458,203 A * | 10/1995 | Evers | A01B 21/08 172/569 |
| 6,276,462 B1 * | 8/2001 | Dietrich, Sr. | A01B 21/08 172/138 |
| 6,412,571 B1 | 7/2002 | McIlhargey | |
| 7,048,069 B1 * | 5/2006 | Bollich | A01B 21/086 172/139 |
| 7,762,345 B2 | 7/2010 | Rozendaal et al. | |
| 8,113,295 B2 | 2/2012 | Rozendaal et al. | |
| 8,196,672 B2 | 6/2012 | Rozendaal et al. | |
| 8,307,908 B2 | 11/2012 | Rozendaal et al. | |
| 8,307,909 B1 | 11/2012 | Rozendaal et al. | |
| 8,365,837 B2 | 2/2013 | Gray et al. | |
| 8,381,827 B2 | 2/2013 | Gray et al. | |
| 2002/0043383 A1 | 4/2002 | Dietrich, Sr. | |
| 2004/0016554 A1 | 1/2004 | McDonald | |
| 2011/0100653 A1 * | 5/2011 | Kromminga | A01B 49/02 172/145 |
| 2011/0132627 A1 | 6/2011 | Gray et al. | |
| 2011/0132628 A1 | 6/2011 | Gray et al. | |
| 2013/0199807 A1 | 8/2013 | Hoffman | |

FOREIGN PATENT DOCUMENTS

| | | |
|---|---|---|
| DE | 19630079 A1 | 1/1998 |
| DE | 102005030923 A1 | 1/2007 |

OTHER PUBLICATIONS

Office Action dated Feb. 26, 2015 on U.S. Appl. No. 13/840,996.

* cited by examiner

*Primary Examiner* — Matthew D Troutman

(57) ABSTRACT

A tillage apparatus includes a wheeled frame configured with a plurality of concave blades arranged in a plurality of longitudinally extending columns and transversely extending rows. The rows are longitudinally spaced apart by a progressively increasing distance. The blades of each column are transversely tilted alternately to the left and right. The blades of each column are transversely offset from one another to create a swath of tilled ground along the width of the column. In operation, soil is thrown left and right between successive blades of a column to till the soil across the width of the column and leave a substantially level soil surface.

20 Claims, 8 Drawing Sheets

APPARATUS AND METHOD FOR SOIL TILLAGE AND LEVELLING

CROSS-REFERENCE TO RELATED APPLICATIONS

This application is a continuation under 37 CFR 1.53(b) of currently pending U.S. patent application Ser. No. 13/840,996 filed Mar. 15, 2013, the entire content of which is hereby incorporated by reference.

TECHNICAL FIELD

This disclosure relates to agricultural equipment, and more particularly, to tillage implements and tillage methods.

BACKGROUND

A tillage implement equipped with rows of spaced apart individually mounted coulter wheel assemblies is known in the art for use in conservation tillage. An example is provided in commonly owned U.S. Pat. No. 7,762,345, which is incorporated herein by reference.

Some coulter wheel assemblies are known to use springs having a horizontal spring axis, such as is shown in commonly owned U.S. Pat. No. 6,412,571, which is incorporated herein by reference.

An example of a tillage implement comprising spaced apart rows of individually mounted tillage blade assemblies having a concave disc blade and a shank with a spring having a horizontal spring axis is provided in commonly owned US patent application published as US 2011/0132628, which is incorporated herein by reference.

An example of a blade assembly and tillage implement equipped therewith comprising a resilient element in place of the coil spring is provided in commonly owned US patent application published as US 2011/0132627, which is incorporated herein by reference.

In conventional tillage operations using implements equipped with concave disc shaped tillage blades (for example, disc harrows), the soil is turned at the site of the disc and crop residue between the discs is buried by thrown soil. In such conventional tillage implements, the disc shaped blades are normally oriented with the concave side of adjacent discs facing the same direction. For example, referring to prior art FIG. 9, a disc harrow is equipped with a first set of concave disc shaped blades 300 mounted on a first common gang shaft 301 with the concave side of the blades facing towards the center of the implement, while a second set of concave disc shaped blades 310 is mounted on a second common gang shaft 311 with their concave sides facing away from the center of the implement. This causes soil to be transferred either towards the center of the implement, leaving a ridge, or away from the center, leaving a valley. In practice, a more acute angle between the gang shafts 301, 310 and the direction of travel of the implement leads to greater soil throw and greater coverage of crop residue between the disc shaped blades, but also leads to larger center ridges and larger valleys at the outside edges of the disc harrow. The farmer is therefore always forced to strike a compromise between effective crop residue coverage and the levelness of the soil surface following tillage.

There is a need for improved tillage implements and methods of use thereof that provide both effective crop residue coverage and a level soil surface following tillage.

SUMMARY

The tillage implements and tillage methods described herein are configured with sets of four or more longitudinally spaced apart tillage blades that co-operate with one another to alternately direct soil to the left and right transversely and rearwardly with respect to the direction of travel of the implement. Each blade is concave and is angled with respect to the vertical direction and the direction of travel of the implement by a pre-determined amount. The amount of rearward direction of the soil increases with each successive blade in the set of four or more tillage blades. This causes the soil to be progressively spread out and leveled as it passes through the implement, thereby both tilling and leveling the soil. This leveling effect desirably mitigates the aforementioned difficulties in maintaining a level soil surface encountered during use of, for example, a disc harrow.

BRIEF DESCRIPTION OF THE DRAWINGS

Having summarized the invention, embodiments thereof will now be described with reference to the accompanying figures, in which.

DETAILED DESCRIPTION

Figure 1:
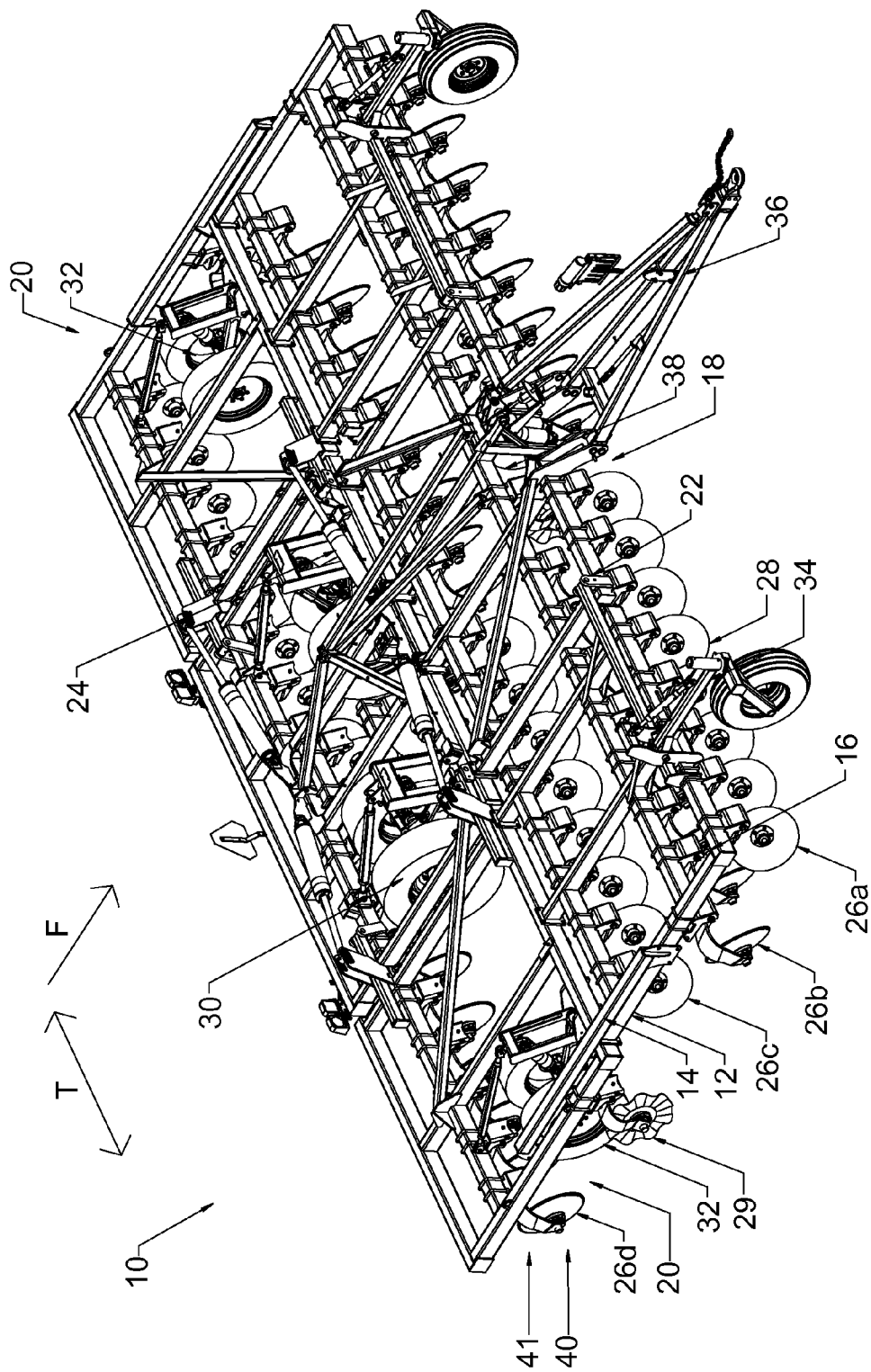
FIG. 1 shows a perspective view of an embodiment of a tillage apparatus.

Referring to FIG. 1, a tillage apparatus 10 comprises a generally rectangular frame 12 formed of a plurality of longitudinal 14 and transverse 16 rectangular steel tubes. The tillage apparatus 10 comprises a central portion, generally denoted as 18, and two wing portions, generally denoted as 20. The tubes 14, 16 of each portion 18, 20 are welded together. Each wing portion 20 is attached to a side of the central portion 18 by hinges 22. Each wing portion 20 has one or more hydraulic cylinders 24 mounted to the central portion 18 and operatively connected to each wing portion 20. Each wing portion 20 is able to pivot from a horizontal ground working orientation to a vertical transport orientation upon actuation of the respective hydraulic cylinder 24.

The tillage apparatus 10 includes a plurality of rows 26a-d of tillage blade assemblies 90, each comprising a concave tillage blade 28. In this embodiment, the number of rows 26a-d is four, although more or fewer may be used in other embodiments. The rows 26a-d are spaced apart along a longitudinal (or forward) direction F and extend in a direction T that is transverse (left/right) to the direction F. Each of the concave blades 28 is individually rotatably attached to the tillage blade assembly 90, which is mounted to the frame 12. When the tillage apparatus 10 is moved in the forward direction F by a towing vehicle, such as a tractor, the concave blades 28 engage the ground to cut, scoop, and throw soil. The concave blades 28 will be discussed in more detail below.

In this embodiment, the tillage apparatus 10 further includes at least one stabilizer blade 29 rotatably attached to the frame 12 by a suitable blade mounting structure. The stabilizer blade 29 is a non-concave blade that has a transverse axis of rotation about which the stabilizer blade 29 is rotatable in the forward direction F to serve to guide and stabilize movement of the tillage apparatus 10 across the ground. The stabilizer blade 29 may assist the tillage apparatus 10 from transverse wandering induced by a tendency for rearward concave blades 28 to pull into troughs cut by forward concave blades 28. The stabilizer blade 29 may have a wavy-edged disc shape or another shape, such as a flat disc shape. In this embodiment, two stabilizer blades 29 are positioned at or near the transverse extents of the tillage apparatus 10.

The tillage apparatus 10 has at least one rearward set of wheels comprising central wheels 30 mounted to the central portion 18 and wing wheels 32 mounted to the wing portions 20. The wheels 30, 32 are arranged to allow rolling movement of the tillage apparatus 10 in the forward direction F. In the embodiment shown, the wheels 30, 32 are each provided as a pair of tandem wheels and are transversely spaced apart to spread the weight of the apparatus in order to prevent rut formation. The wheels 30, 32 may be forwardly spaced apart as well. The wheels 30, 32 may be configured in a walking axle arrangement. A walking axle arrangement allows the tillage apparatus 10 to accommodate variations in the soil surface by permitting the wheels 30, 32 to travel over obstacles without lifting the tillage apparatus 10 to the same degree as would occur without walking axles. The wheels 30, 32 are height-adjustable to set the operational depth of the blades 28. In this embodiment, the wheels 30, 32 are located at a position forward of a rearmost row 26d of concave blades 28 and rearward of a row 26c adjacent the rearmost row 26d. Advantages associated with this wheel placement will be further described hereinafter. In this embodiment, two pairs of wheels 30 are mounted to the central portion 18 of the frame 12 and one pair of wheels 32 is mounted to each wing portion 20 of the frame 12.

The tillage apparatus 10 further includes one or more forward wheels 34 mounted to the frame 12 at a position forward of a forward-most row 26a of concave blades 28 and arranged to permit movement of the tillage apparatus 10 in the forward direction F. Each of the forward wheels 34 is height-adjustable. Each of the forward wheels 34 may be a caster wheel that is able to rotate about a vertical axis in response to directional changes of the apparatus. In this embodiment, one forward wheel 34 is mounted to each wing portion 20 of the frame 12. The forward wheels 34 advantageously maintain the rectangular frame 12 in a desired angular orientation with respect to the soil surface and prevent inadvertent digging of the front row 26a of tillage blades into the soil surface when ruts are encountered in the field.

The tillage apparatus 10 has a coupling mechanism 36 at the front thereof for hitching the tillage apparatus 10 to the drawbar of a vehicle, such as a tractor (not shown). The coupling mechanism 36 is pivotally attached to the central portion 18 of the frame 12 at a tongue hinge 38. The angle of the coupling mechanism 36 with respect to the tillage apparatus 10 can be made adjustable by use of an adjusting mechanism (not shown). The front wheels 34 therefore allow the orientation of the frame 12 to be set relative to the soil surface, irrespective of the orientation of the coupling mechanism 34.

The tillage apparatus 10 can further include rear-mounted leveling attachments that can be attached to a rear of the frame 12. An optional set of spike harrows (not shown) and/or an optional set of rolling harrows (not shown) may be connected to the rear of the tillage apparatus 10. When both sets of harrows are provided, the rolling harrows may be provided rearward of the spike harrows. This configuration serves to further level the ground and break up any lumps of soil that may have been created by the concave blades 28, particularly in wet conditions.

Figure 2:
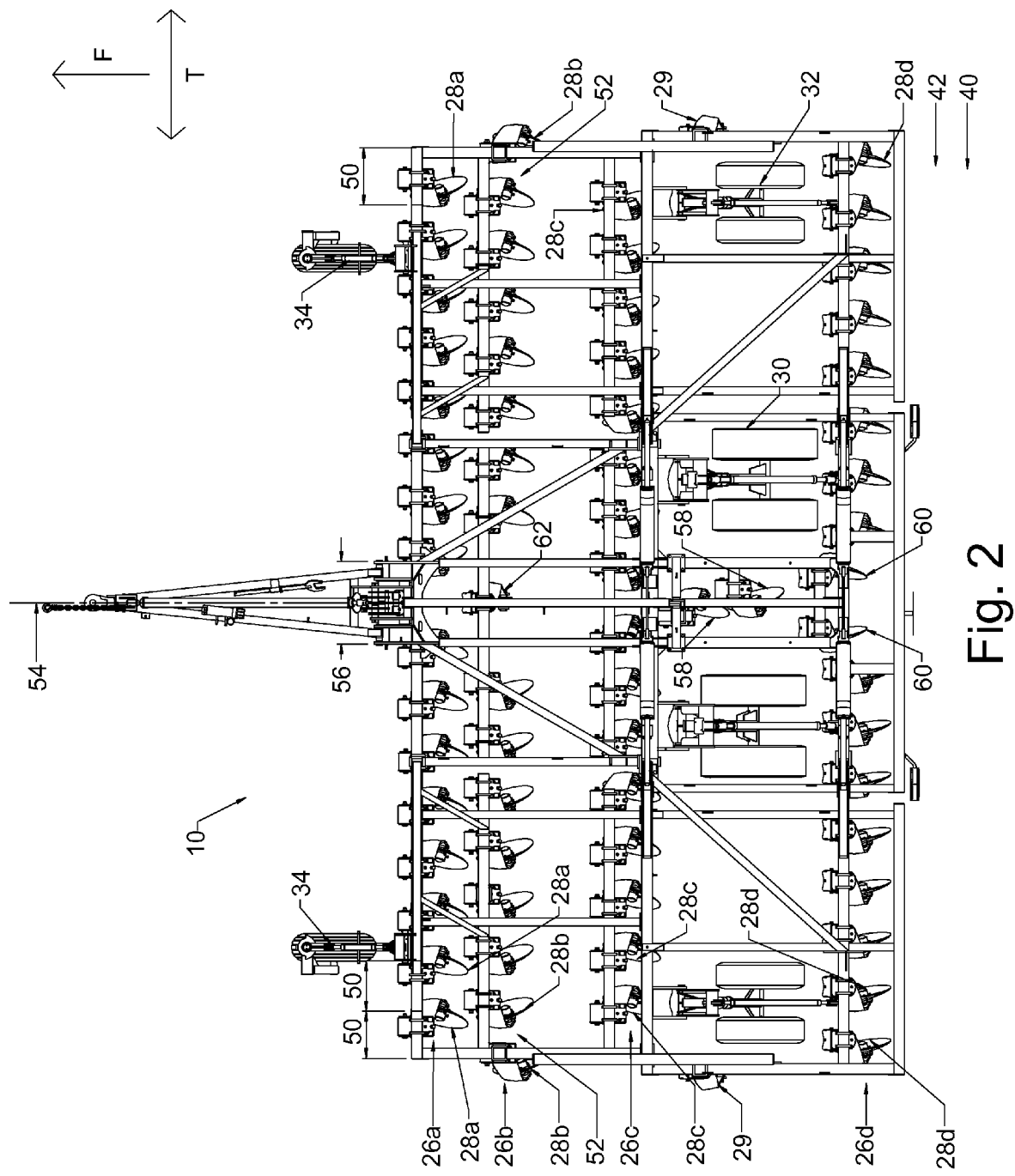
FIG. 2 shows a plan view of the tillage apparatus of FIG. 1.

FIG. 2 shows a plan view of the tillage apparatus 10 showing an arrangement of concave blades 28. In the following description, concave blades may be referred to generally with reference numeral 28 and may be referred to specifically based on row using reference numerals 28a-d. This is for the sake of clarity and is not intended to be limiting.

The concave blades 28 are aligned in transversely extending rows 26a-d in a plurality of side by side longitudinally extending columns 50, 50'. The concave blades 28a-d in a given column 50, 50' are transversely offset from one another to create a swath of tilled ground along a transverse width of the column 50, 50'.

The concave blades 28a-d of a given row 26a-d do not need to form a straight line and can be somewhat offset from one another in the longitudinal direction, denoted by arrow F. For example, referring to row 26a, an outermost concave blade 28b is rearward of the adjacent concave blade, denoted 52, in the same row 26a.

The columns 50, 50' of concave blades 28 are positioned in a mirrored arrangement about a longitudinally aligned central axis 54 of the tillage apparatus 10. That is, blades 28 in columns 50 on one side of the central axis 54 are positioned and tilted with mirrored symmetry with respect to blades 28 in columns 50' on the other side of the central axis 54. This can help the tillage apparatus 10 pull straight forward across the ground and reduce or eliminate any tendency for the tillage apparatus 10 to pull transversely left or right.

The concave blades of a given column 50, 50' are transversely tilted left or right alternately by row 26a-d in order to cut, scoop, and then throw tilled soil transversely back and forth as the tillage apparatus 10 is pulled forward. That is, for any given column 50, 50', the concave blade 28a faces outwardly away from the central axis 54 of the tillage apparatus 10, while the concave blade 28b behind the concave blade 28a faces inwardly. Likewise, the next concave blade 28c faces outwardly and the rearmost concave blade 28d faces inwardly. Tilled ground is thus tossed outwardly, inwardly, outwardly, and inwardly again as it is thrown between the concave blades 28a, 28b, 28c, 28d. By throwing the soil back and forth in this manner, any clumps of material are broken up; this results in less ribboning in the finished ground surface. This desirably creates a more level tilled soil surface.

It will be evident to those skilled in the art that substantially the same effect could be achieved if the blades were oriented oppositely to the orientation described herein. However, by configuring the lead row 26a, to have its concave blades 28a facing outwards, away from the central axis 54, accumulation of material near the central axis 54 is advantageously reduced where they blades have maximum angle with respect to the longitudinal direction, which reduces the chance of plugging of soil flow through the implement and creating a large ridge. Therefore, the configuration shown is especially desirable compared with the opposite configuration.

The mirrored symmetry of columns 50, 50' of blades 28 about the central axis 54 may result in a central geometric discontinuity in or around a central region 56. Tillage of ground in the central region 56 can be facilitated by central pairs of concave blades 58, 60. In this embodiment, the concave blades 58 are forward of the concave blades 60. The concave blades 58 are closer to the central axis 54 than are the concave blades 60. The transverse spacing between the concave blades 58 is less than the transverse spacing between the concave blades 60, while the longitudinal spacing between the concave blades 58 is greater than the longitudinal spacing between the concave blades 60. The concave blades 58 are tilted to face outwardly, away from the central axis 54, while the concave blades 60 are tilted to face inwardly towards the central axis 54. One result of this arrangement of the central concave blades 58, 60 is that tilled ground in the central region 56 is thrown outwardly before being thrown inwardly, which advantageously leads to greater spreading and leveling of soil, resulting in more even tillage in the central region 56.

The spacing of the rows 26a-d in the longitudinal direction can be selected to improve tillage and reduce the chance of plugging or seizing of blades 28. Row spacing can be selected in a manner so that the spacing between a rearward adjacent pair of rows is greater than the spacing between a forward adjacent pair of rows. Accordingly, the spacing between second and third rows 26a, 26c is greater than the spacing between first and second rows 26a, 26a.

In this embodiment, the spacing between third and fourth rows 26c, 26d is also greater than the spacing between second and third rows 26a, 26c. However, in another embodiment, the spacing between third and fourth rows 26c, 26d is substantially the same as the spacing between second and third rows 26a, 26c. In still another embodiment, the wheels 30, 32 are positioned between the second and third rows 26a, 26c and the spacing between the second and third rows 26a, 26c is accordingly greater than the spacing between the third and fourth rows 26c, 26d. This will be described in greater detail hereinafter with reference to FIG. 8.

Also shown in FIG. 2 is a central stabilizer blade 62 located at the central axis 54. The central stabilizer blade 62 is similar to the previously described stabilizer blades 29 and the related description can be referenced.

In this embodiment, the blades 28a-d of the rows 26a-d and the centrally located blades 58, 60 are all transversely tilted concave blades. In another embodiment, the blades of the rearmost row 26d can be wavy blades that are not transversely tilted and similar to the stabilizer blades 29, 62.

Figure 3:
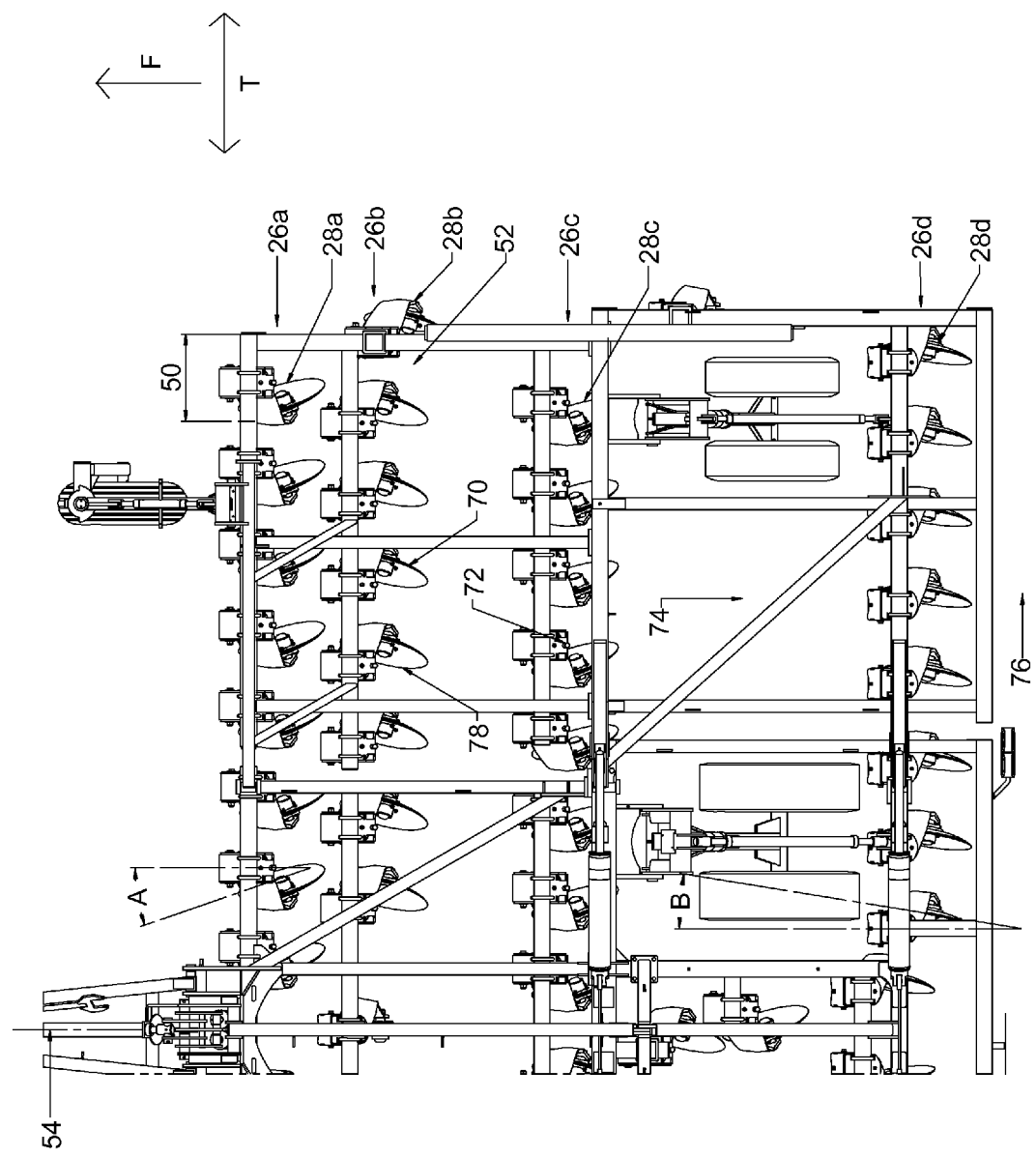
FIG. 3 shows an enlarged plan view of one side of the tillage apparatus of FIG. 1.

Further detail regarding the arrangement of blades 28 will now be discussed with respect to FIG. 3, which shows a plan view of one side of the tillage apparatus 10. It should be understood that the description below also applies to the opposite side, not depicted in FIG. 3.

Referring to the column 50', the concave blades 28b and 28c in the second and third rows 26a, 26c, are positioned at opposite transverse extents of the width of the column. In addition, these two concave blades 28b, 28c are in adjacent rows and oppositely transversely tilted with respect to each other. The forward concave blade 28b is inwardly transversely tilted and the rearward concave blade 28c is outwardly transversely tilted. Adjacent columns may transversely overlap, so that some portion of ground is tilled by blades 28 of both columns.

Still referring to column 50', the first row 26a is outwardly offset from the third row 26c, and the fourth row 26d is inwardly offset from the second row 26a. In this example, the width of the column 50' is 20-inch (or 52 cm). The rows 26a-d are evenly offset within this pitch, such that blades 28a-d of each row are transversely offset from each other by an offset distance equal to the column width divided by the number of rows, which in this example is 5 inches (or 13 cm). The column width and offset dimensions discussed are but one illustrative example.

Depending on the column width, offset of the blades 28, diameter of the blades and the depth at which they are set, two transversely adjacent concave blades 28 may be separated by a transverse gap in which ground is not directly contacted by any of the concave blades 28. However, the arrangement of the blades 28 as described herein advantageously tills the soil in such a gap due to direct tillage of adjacent soil by nearby concave blades 28 and throwing of soil over the untilled gap.

As mentioned above, the forward spacing between the rows 26a-d can be selected so that the spacing between a rearward adjacent pair of rows is greater than the spacing between a forward adjacent pair of rows. Since tilled soil is thrown from a forward concave blade 28 into the path of rearward concave blade 28, such spacing can advantageously allow thrown material to disperse across the ground in order to reduce the chance that blades 28 receiving thrown material will become plugged. In this embodiment, longitudinal row spacing may be selected so that the spacing between a forward adjacent pair of rows is between about 1 and about 1.5 times the overall diameter of the blades 28 and the spacing between a rearward adjacent pair of rows is between about 1.5 and about 4 times the overall diameter of the blades 28. For example, the spacing between the first and second rows 26a, 26a can be between about 1 and about 1.5 times the overall diameter of the blades 28, and can in this example be about 1.2 times the overall diameter of the blades 28. Accordingly, the spacing between the second and third rows 26a, 26c can be between about 1.5 and about 4 times the overall diameter of the blades 28, and can in this example be about 1.9 times the overall diameter of the blades 28. Likewise, the spacing between the third and fourth rows 26c, 26d can be between about 1.5 and about 4 times the overall diameter of the blades 28, and can in this example be about 3.7 times the overall diameter of the blades 28.

In another embodiment, the spacing between a forward adjacent pair of rows is between about 1 and about 1.5 times the overall diameter of the blades 28, while the spacing between a rearward adjacent pair of rows is between about 1.5 and about 2.5 times the overall diameter of the blades 28. In such embodiment, the wheels 30, 32 can be located elsewhere, such as at the transverse extents of the apparatus 10, if there is not enough space among the blades 28 to accommodate them.

The concave blades 28a-d may be transversely tilted by different angular amounts based on their longitudinal position on the apparatus. That is, while the blades 28a-d in a given row may be transversely tilted by the same angle, the blade angles used for successive rows 26a-d may be different. In one embodiment, the transverse tilt angle A of the rows 26a-c are the same and greater than the transverse tilt angle B of the rearmost row 26d. Since no concave blades follow the rearmost row 26d, the reduced transverse tilt angle B of the blades in the rearmost row 26d can advantageously result in less transverse displacement of soil by the blades 28d of the rearmost row 26d. In one example, the transverse tilt angle A is about 16 degrees and the transverse tilt angle B is about 8 degrees, or about half the angle A.

Regarding the flow of tilled soil when the tillage apparatus 10 is in motion, each concave blade 28a in the forward-most row 26a throws soil, at 70, towards the respective concave blade 28b in the second row 26a. Most of the thrown soil lands on or lands in the path of the concave blade 28b, which in turn throws, at 72, most of such material, as well as additional soil cut and scooped by the concave blade 28b, towards the respective concave blade 28c in the third row 26c. The concave blade 28c throws, at 74, such material, as well as additional soil cut and scooped by the concave blade 28c, towards the respective concave blade 28d of the rearmost row 26d. Most of the material thrown by the concave blade 28c lands on or lands in the path of the rearmost concave blade 28d, which throws, at 76, such material, as well as additional soil cut and scooped by the concave blade 28d, into a substantially level surface rearward of the implement.

In addition, because of the blade arrangement described herein, a concave blade 28a-d can advantageously keep a neighboring concave blade 28a-d in the same row 26a-d free of built-up ground material, which may collect on the backs of concave blades 28a-d particularly when the ground is wet.

This principle applies to any of the concave blades 28a-d that have a neighboring concave blade 28a-d at their back. It should be noted that each of the outermost concave blades 28b of the second row 26a is offset rearward from other concave blades 28b in the same row, because each blade 28b receives a significant amount of thrown material from the respective concave blade 28a in the forward row 26a, but the outermost blade 28b does not have a neighboring concave blade to provide this cleaning effect. The relatively small rearward offset of each of the outermost concave blades 28b can reduce the amount of thrown material reaching the backside of the blade and thus reduces the chance of material build-up clogging the back side of the blade. The outermost concave blades 28c-d of the rows 26c-d are not offset in this manner, as the spacing of each of these rows 26c-d with respect to the row ahead is large enough to reduce the risk of detrimental material build-up on the back side of the blade.

Figure 4:
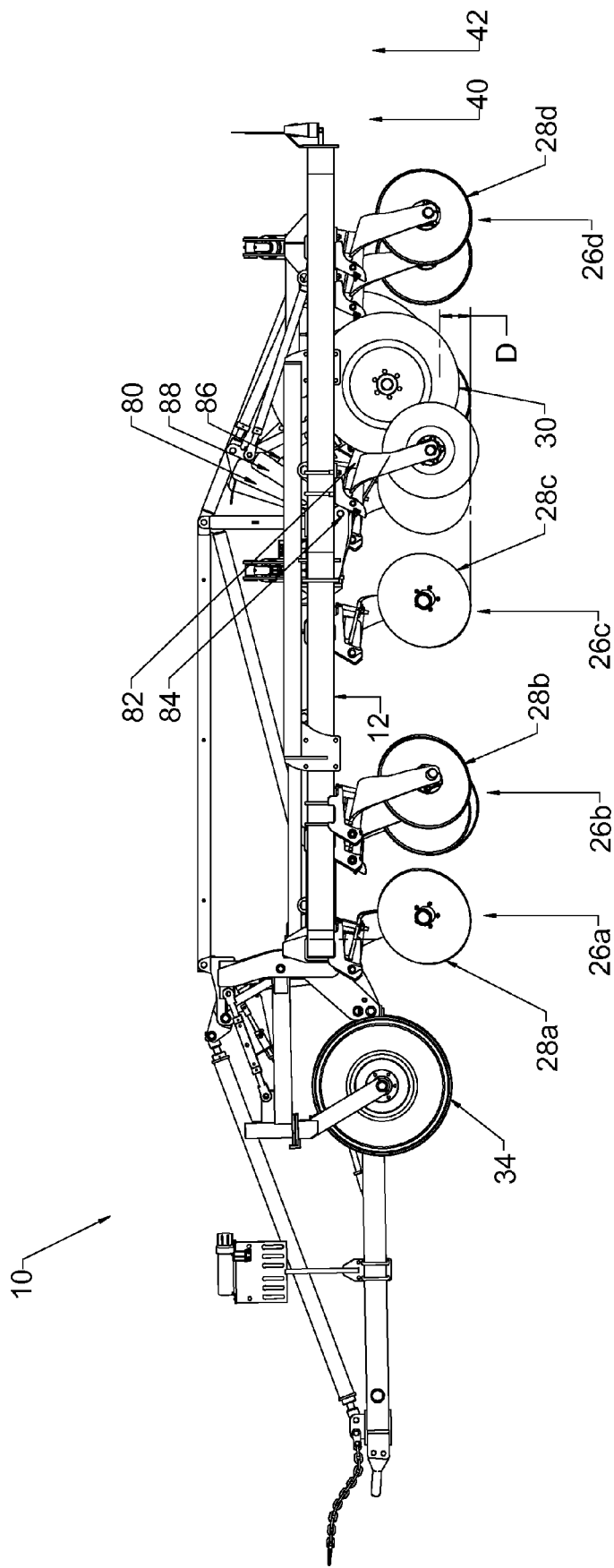
FIG. 4 shows a side view of the tillage apparatus of FIG. 1.

FIG. 4 shows a side view of the tillage apparatus 10. Some components are omitted from this view for clarity.

The tillage apparatus 10 includes at least one depth-adjustment mechanism 80 for the rearward wheels 30, 32 in order to control the depth of tillage D. Each depth-adjustment mechanism 80 includes an arm 82 that is pin-connected, at 84, to a bracket that is fixed to the frame 12. The hubs of one or more wheels 30, 32 are connected to an opposite end of the arm 82. A hydraulic cylinder 88 is pin-connected between the hubs of the one or more wheels 30, 32 and a pillar 86 extending upwards from the frame 12. When the hydraulic cylinder 88 is retracted, the wheels 30, 32 are moved further into the accommodating space of the frame 12, the frame 12 is lowered, and the depth of tillage D is increased. When the hydraulic cylinder 88 is extended, the wheels 30, 32 are pushed out of the accommodating space of the frame 12, the frame 12 is raised, and the depth of tillage D is decreased. The hydraulic cylinder 88 may include a damper to reduce vibrational effects of uneven ground on the frame 12 during use. In this embodiment, pairs of wheels 30, 32 are provided with one depth-adjustment mechanism 80.

In this embodiment, the depth-adjustment mechanisms 80 allows for a selectable depth of tillage D of between about 1 and about 6 inches (about 2.5 to 15 cm).

The forward wheels 34 can be provided with a depth-adjustment mechanism similar to the depth-adjustment mechanism 80 or with a different depth-adjustment mechanism. Alternatively, the wheels 34 are not height-adjustable.

Configuring the apparatus 10 with wheels 30, 32 between the third and fourth rows 26c and 26d causes forward weight transfer onto the hitch. This weight transfer is accepted by the forward wheels 34, which can be independently depth adjusted to control the amount of "bite" of the forward rows 26a, 26a in order to throw more or less soil, as determined by the farmer in accordance with the tillage objectives and soil conditions. In addition, configuring the apparatus 10 with longitudinally spaced apart forward wheels 34 and rear wheels 30, 32 provides a more uniform ride across rough ground, ultimately providing greater control over tillage depth. Therefore, this wheel configuration provides for improved tillage performance and soil leveling.

Figure 5:
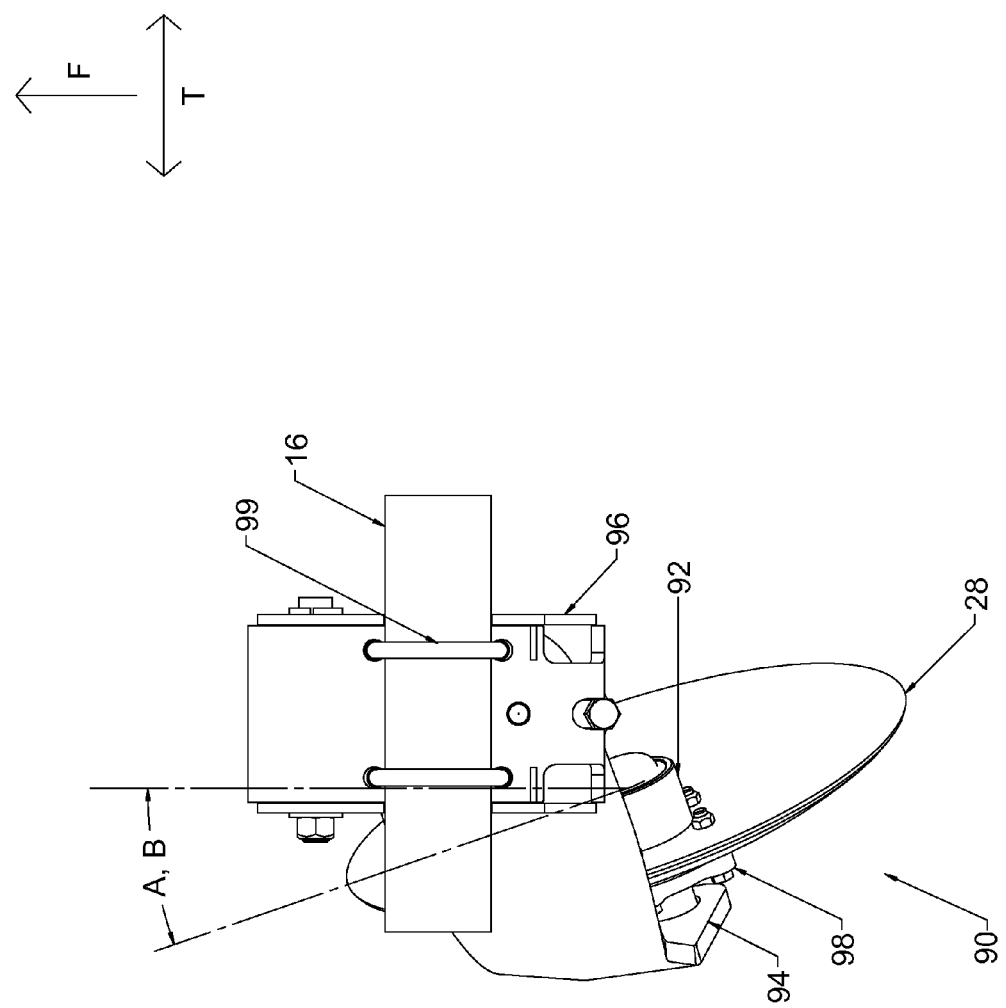
FIG. 5 shows a top view of a concave disc shaped tillage blade.

FIG. 5 shows one of the concave blades 28 from above. Each concave blade 28 is part of a blade assembly 90 that includes the concave blade 28, a blade hub 92, a blade arm 94, and a blade mount 96.

The concave blade 28 is removably mounted to the blade hub 92 by way of bolts 98. The blade hub 92 can include a lubricated bearing to reduce rotating resistance. The blade hub 92 is attached to the blade arm 94 in a manner that permits rotation of the blade 28. The blade arm 94 is attached to the blade mount 96, which is removably connected to a transverse member 16 of the frame 12 (FIG. 1) by way of, for example, U-bolts 99. The transverse position of the concave blade 28 with respect to other concave blades 28 can be adjusted using the U-bolts 99. The U-bolts 99 also permit the blade assembly 90 to be removed from the frame 12 for maintenance or replacement.

The blade arm 94 is shaped to transversely tilt the blade 28, as indicated by angles A, B discussed above. The material and size of the blade arm 94, and particularly its cross-section, can be selected to permit transverse deflection of the blade arm 94 and thus the attached blade 28 to advantageously reduce the chance or amount of damage to the blade 28 due to impact with obstacles, such as rocks, while in use. However, the material and size of the blade arm 94 can also be selected to limit such deflection in order to mitigate the tendency of the blade 28 to pull into grooves in the ground cut by blades ahead. In this embodiment, the blade arm 94 is made of steel and has a rectangular cross-section that is sized to keep transverse deflection to within about 0.25-1 inch (6.25-25 mm) under normal loads experienced during normal tilling operations.

As mentioned previously, in this embodiment, the transverse tilt angle A, B of the concave blade 28 can be about 16 degrees for rows 26a-c and about 8 degrees for rearmost row 26d. In other embodiments, the transverse tilt angle for a concave blade 28 not in the rearmost row can range from about 12 degrees to about 20 degrees, while the transverse tilt angle for a concave blade 28 in the rearmost row can range from about 4 degrees to about 12 degrees. Larger transverse tilt angles can mean a wider swath of tillage by a given blade 28, but can also mean greater resistance to pulling and a greater tendency to pull the tillage apparatus 10 sideways.

Figure 6:
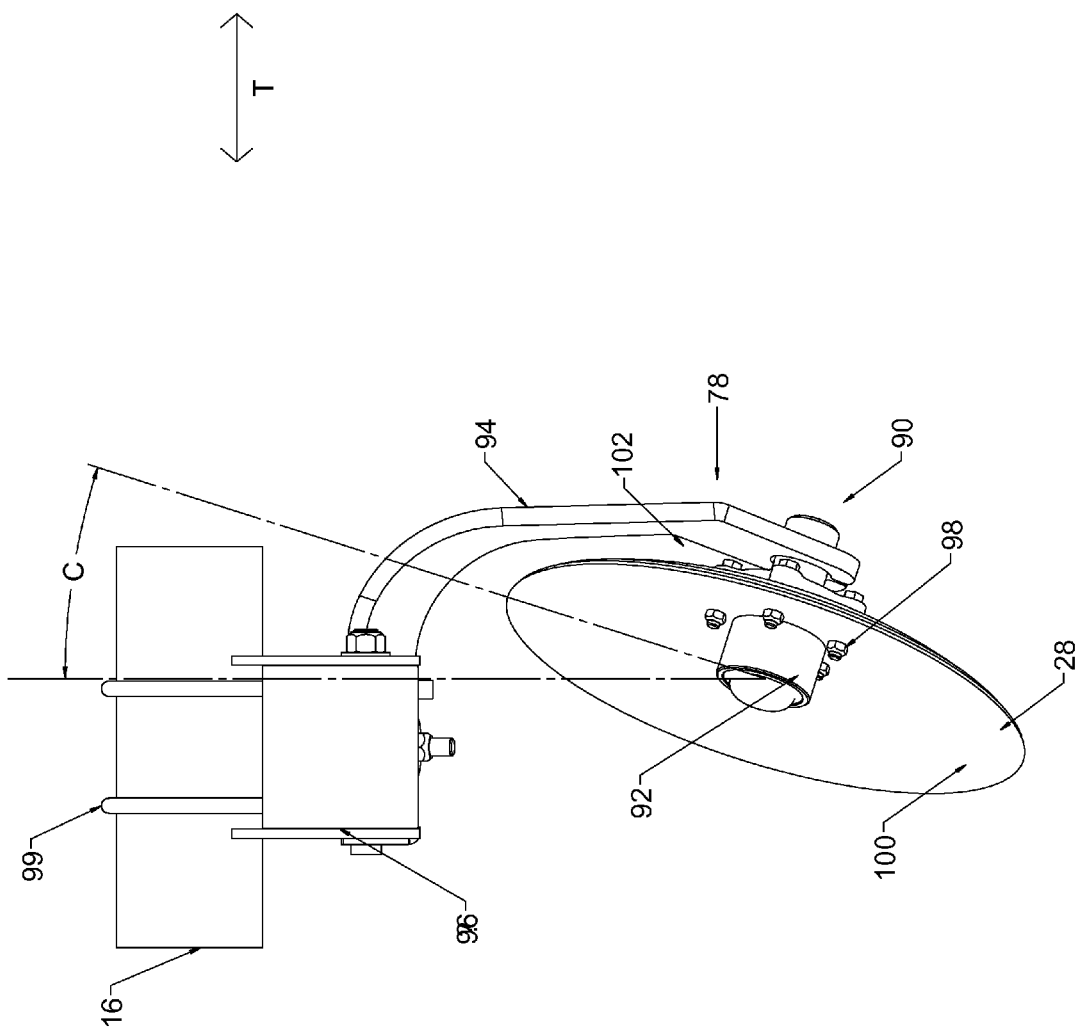
FIG. 6 shows a front view of the blade of FIG. 5.

FIG. 6 shows one of the concave blades 28 from the front. As can be seen, the concave blade 28 is tilted from the vertical by an angle C. This assists in the concave blade 28 scooping up ground material at a region 100 where it cuts into the ground. To an extent, the greater the vertical tilt angle C, the greater the amount of ground material that can be scooped up and then thrown. However, increased vertical tilt angle C can also increase resistance to pulling. In this embodiment, the vertical tilt angle is about 16 degrees for blades 28a-c in forward rows 26a-c, and the vertical tilt angle is about 8 degrees for blades 28d in the rearmost row 26d. In other embodiments, the vertical tilt angle for a concave blade 28 not in the rearmost row can range from about 12 degrees to about 20 degrees, while the vertical tilt angle for a concave blade 28 in the rearmost row can range from about 4 degrees to about 12 degrees. The vertical tilt angle C and transverse tilt angles A, B for a given blade 28a-d can be the same or can be different.

Also shown in FIG. 6 is the impingement of thrown soil, at 78, on the backside of the concave blade assembly 90, as discussed above. Impinging material can help keep the concave blade assembly 90 free of material built up, particularly between the blade 28 and the blade arm 94, at 102, because impinging material has high enough kinetic energy to itself not become built up on the blade assembly 90 and further to dislodge any already built-up material. Material impingent, at 78, is thus advantageous, since material build up may result in the blade 28 seizing and thus stopping to rotate, which would require the tillage apparatus 10 to be stopped and cleaned manually.

Figure 7:
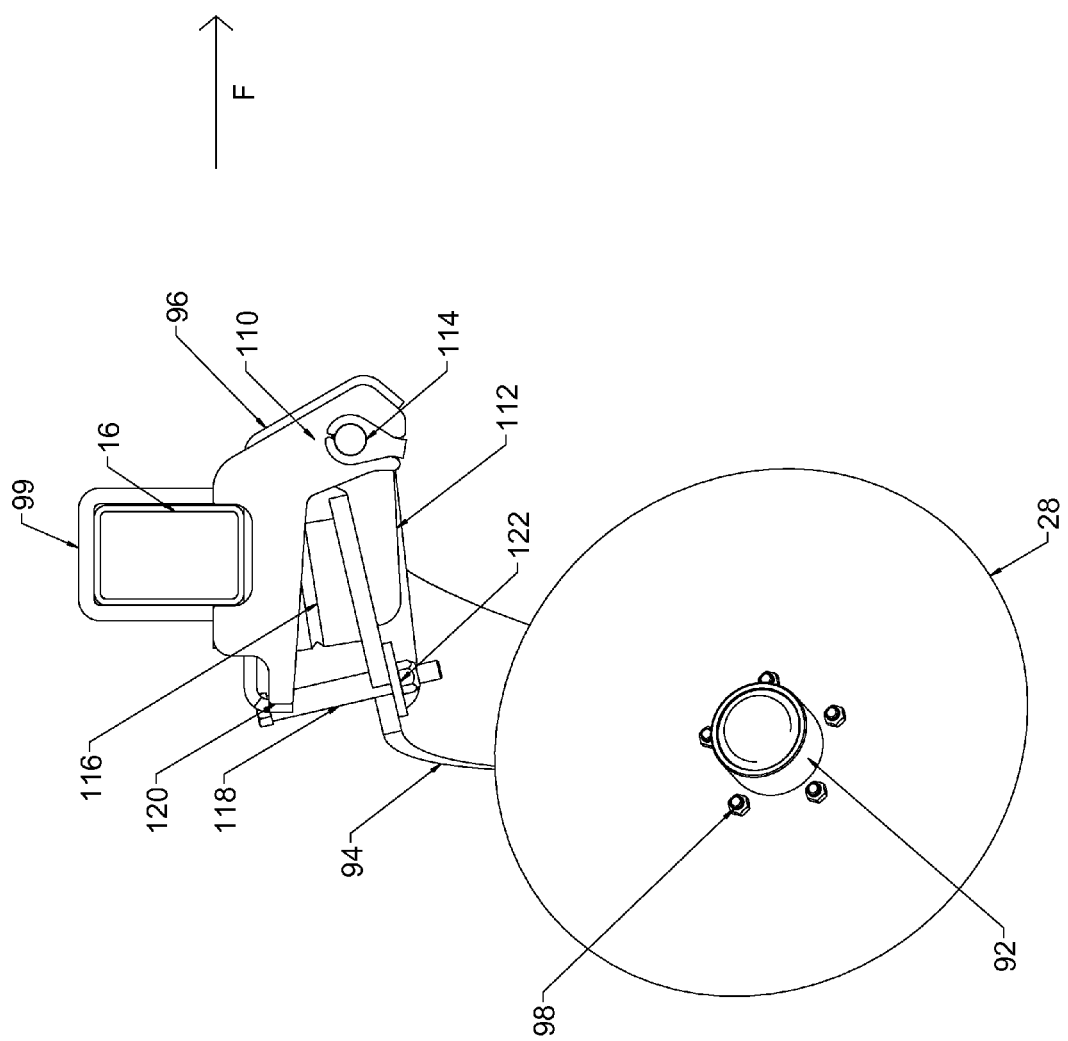
FIG. 7 shows a side view of the blade of FIG. 5.

FIG. 7 shows one of the concave blades 28 from the concave side. As can be seen, the blade mount 96 includes an upper hinge part 110 and a lower hinge part 112 that are pin-connected together at 114. The upper hinge part 110 is held to the transverse tube 16 by the U-bolts 99. The blade arm 94 is fixed to the lower hinge part 112. The upper and lower hinge parts 110, 112 form an acute angle in which a resilient part 116 is sandwiched. The resilient part 116 can include a piece of elastomeric material, a metal coil spring, or the like. An adjustable stop pin 118 extends between the upper and lower hinge parts 110, 112 to limit the amount that the hinge formed by the upper and lower hinge parts 110, 112 can open.

In this embodiment, the stop pin 118 is thread connected, at 120, to the upper hinge part 110. Such a threaded connection can be via a bolt that threads into a central threaded bore of the stop pin 118, the bolt extending through an opening in the upper hinge part 110 against which a head of the bolt abuts. Similarly, the stop pin 118 extends through an opening in the lower hinge part 112 and has an enlarged head 122 that abuts the lower hinge part 112 on the lower side of the opening to restrict movement of the lower hinge part 112 with respect to the upper hinge part 110, which tends to open the hinge. A bolt threaded into the stop pin 118 can be turned to adjust the maximum amount that the hinge is permitted to open. However, the lower hinge part 112 is free to move away from the enlarged head 122 of the stop pin 118, in a direction that closes the hinge, as the resilient part 116 is compressed during tillage operations.

The resilient movement of the concave blade 28 as provided for by the resilient part 116 and as limited by the adjustable stop pin 118 can advantageously reduce the chance and amount of damage to the blade 28 during operation, while maintaining an accurate depth of tillage to the ground. Such structure also allows the tillage apparatus to be operated at relatively high rates of speed while reducing the damage to the concave blades 28 when obstacles, such as rocks, are struck.

Other suitable designs for blades and tillage assemblies usable with the tillage apparatus 10 are described in the published US patent applications and patents mentioned above.

Figure 8:
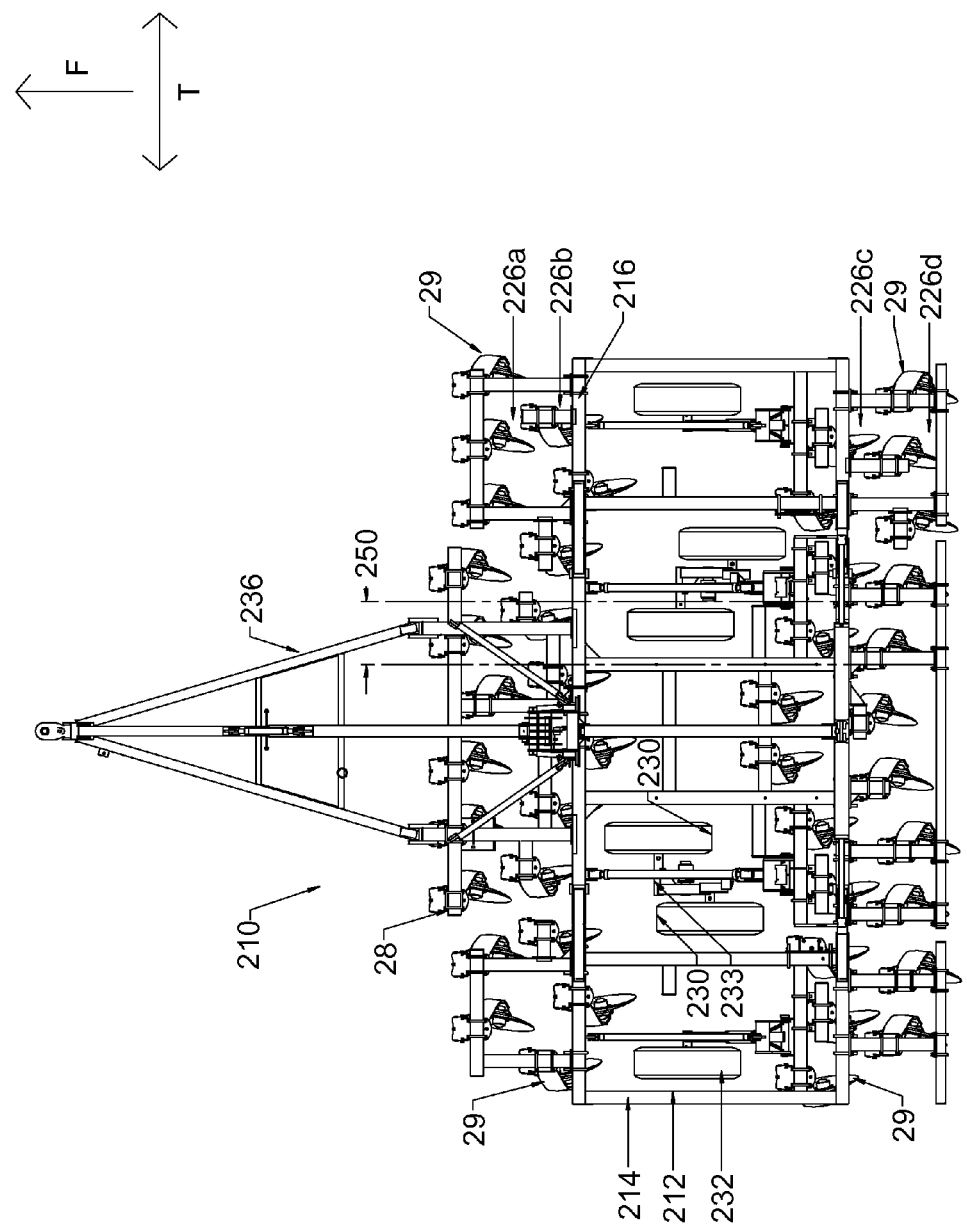
FIG. 8 shows a plan view of a tillage apparatus according to another embodiment.

FIG. 8 shows another embodiment of a tillage apparatus 210. The tillage apparatus 210 is similar to the tillage apparatus 10. Differences between the tillage apparatus 210 and the tillage apparatus 10 will be discussed in detail below. For further description of features and aspects of the tillage apparatus 210, the description of the tillage apparatus 10 can be referenced. Features and aspects of the tillage apparatus 10 can be used with the tillage apparatus 210.

The tillage apparatus 210 includes a frame 212 made of longitudinally aligned members 214 and transversely aligned members 216. The description for frame 12 and members 14, 16 may be referenced for further detail.

The tillage apparatus 210 further includes wheels 230, 232. Two sets of inner wheels 230 are arranged in pairs, with each pair configured with a walking axle 233. Two outer wheels 232 are positioned outward of the wheels 230. The description for the wheels 30, 32 may be referenced for further detail.

The tillage apparatus 210 further includes a coupling mechanism 236 for pulling the tillage apparatus and the above-described coupling mechanism 36 may be referenced.

In this embodiment, the tillage apparatus 210 includes four stabilizer blades 29 positioned at the four corners of the frame 212. The tillage apparatus 210 also includes a plurality of concave blades 28 individually attached to the frame 212 and arranged in four rows 226*a-d*.

The blades 28 are arranged in longitudinaly aligned columns 250. The blades 28 in each row 226*a-d* are transversely tilted opposite the blades in an adjacent row 226*a-d*. In this embodiment, the blades 28 of the forward-most row 226*a* are transversely tilted in the same direction (right) as the blades 28 of the rearmost row 226*d*, while the blades 28 of the inner two rows 226*a-c* are transversely titled opposite (left) to the blades 28 of the rows 226*a*, 226*d*. In this embodiment, all of the blades 28 are transversely tilted the same amount. The blades 28 are also vertically tilted.

In addition, a forward pair of adjacent rows 226*a*-226*a* are spaced apart by a distance less than the spacing between a rearward pair of adjacent rows 226*a*-226*c*.

As can be seen, the blades 28 of the tillage apparatus 210 are not symmetrically arranged in the same manner as in other embodiments. However, transverse pulling of the tillage apparatus 210 can be mitigated by having approximately equal numbers of blades 28 facing left and right. Also, due to the lack of symmetry, the tillage apparatus 210 does not have a central discontinuous region 56 and thus does not have central blades 58, 60 as previously described with reference to the first embodiment.

It should be noted that in many embodiments discussed herein, the number of blades transversely titled in one direction (e.g., left) is about equal to the number of blades in the opposite direction (e.g., right).

The tillage apparatus can advantageously be pulled at relatively high speeds of about 6 to 12 mph (about 10 to 20 km/hr), depending on ground conditions including soil wetness and the amount of crop residue present in or on the soil, as well as the desired soil surface finish. This is due to the mirrored symmetry of blades functioning to pull the tillage apparatus straight, and the concave shape and vertical tilt of the blades tending to pull the frame, and thus blades, towards the ground in a manner that increases with increased speed. This can alleviate the need to add weight to the tillage apparatus to maintain operational contact with the ground at higher speeds. Moreover, impingement of material on a blade from a neighboring blade keeps the blades clean in a manner that also increases with increased speed. The tillage apparatus therefore allows a field to be tilled in less time.

The arrangement, tilting, and mounting structure of the concave blades as described above causes a reduction in forces that would tend to twist or break the blades, while still allowing a significant amount of ground material to be thrown. Moreover, rearward blades are prevented from tracking in ruts cut by blades ahead. In addition, the arrangement and tilt of the concave blades, particularly the mirrored nature of the arrangement, reduces the undesirable tendency for the tillage apparatus to pull sideways. Finally, a more uniformly tilled and level soil surface is created.

The tillage apparatus allows for a larger amount of soil to be thrown than with prior tillage apparatus, while leaving an even soil surface. The tillage apparatus is operable at high speeds in wet conditions without undue amounts of downtime due to blade breakage, seizure, or plugging.

While the foregoing provides certain non-limiting embodiments, it should be understood that combinations, subsets, and variations of the foregoing are contemplated. The monopoly sought is defined by the claims which are intended to be construed broadly and limited only by the specification.

What is claimed is:

1. A tillage apparatus comprising:
   a frame configured to be moved in a longitudinal direction by a vehicle; and
   a plurality of tillage assemblies, each tillage assembly having a concave disc shaped tillage blade rotatably attached thereto configured in a plurality of transversely adjacent columns, the tillage assemblies of the plurality of columns arranged in at least four transversely extending rows that are spaced apart along the longitudinal direction, each of the tillage assemblies being individually mounted to the frame, the concave blades of each column being transversely tilted from the longitudinal direction left or right alternately by row, wherein longitudinal spacing between a rearward adjacent pair of rows is greater than longitudinal spacing between a forward pair of rows, wherein in each column the concave blade of a rearmost row is transversely tilted less than the concave blade of a row forward of the rearmost row, the concave blades in the rows forward of the rearmost row transversely tilted at an angle in a range from about 12 degrees to about 20 degrees, the concave blades of each column being transversely offset from one another to create a swath of tilled ground, wherein two of the concave blades of each column are at opposite transverse extents of a width of the column, and wherein the two concave blades are in adjacent rows and oppositely oriented with respect to one another.

2. The apparatus according to claim 1, wherein the concave blades in the rearmost row are vertically tilted at an angle in a range from about 4 degrees to about 12 degrees.

3. The apparatus according to claim 1, wherein the concave blades in the rows forward of the rearmost row are vertically tilted at an angle in a range from about 12 degrees to about 20 degrees.

4. The apparatus according to claim 1, wherein spacing in the longitudinal direction between the rearmost row and a row adjacent the rearmost row is greater than spacing in the longitudinal direction between any pair of adjacent rows forward of the rearmost row.

5. The apparatus according to claim 1, wherein spacing between the rearmost row and the row adjacent the rearmost row is between about 1.5 and about 4 times the diameter of the concave blades, and wherein spacing between the forward adjacent pair of rows is between about 1 and about 1.5 times the diameter of the concave blades.

6. The apparatus according to claim 1, wherein adjacent columns transversely overlap.

7. The apparatus according to claim 1, wherein the concave blades of each column are evenly transversely offset from one another by an offset distance equal to a width of the column divided by the number of rows.

8. The apparatus of claim 1, wherein the tillage assemblies of the at least four transversely extending rows are individually mounted to a common frame.

9. The apparatus of claim 1, wherein the concave blades in the rearmost row have a transverse tilt angle of about half of a transverse tilt angle of the concave blades in the rows forward of the rearmost row.

10. The apparatus according to claim 1, wherein the concave blades in the rearmost row are transversely tilted at an angle in a range from about 4 degrees to about 12 degrees.

11. A tillage apparatus comprising:
a frame configured to be moved in a longitudinal direction by a vehicle;
a plurality of tillage assemblies, each tillage assembly having a concave disc shaped tillage blade rotatably attached thereto configured in a plurality of transversely adjacent columns, the tillage assemblies of the plurality of columns arranged in at least four transversely extending rows that are spaced apart along the longitudinal direction, each of the tillage assemblies being individually mounted to the frame, the concave blades of each column being transversely tilted from the longitudinal direction left or right alternately by row, wherein longitudinal spacing between a rearward adjacent pair of rows is greater than longitudinal spacing between a forward pair of rows, wherein in each column the concave blade of a rearmost row is transversely tilted less than the concave blade of a row forward of the rearmost row, the concave blades of each column being transversely offset from one another to create a swath of tilled ground, wherein two of the concave blades of each column are at opposite transverse extents of a width of the column, and wherein the two concave blades are in adjacent rows and oppositely oriented with respect to one another; and, a rearward set of wheels to move the tillage apparatus in the longitudinal direction, the set of wheels mounted to the frame at a position forward of the rearmost row and rearward of a row adjacent the rearmost row.

12. The apparatus of claim 11, wherein the concave blades in the rearmost row have a transverse tilt angle of about half of a transverse tilt angle of the concave blades in the rows forward of the rearmost row.

13. The apparatus according to claim 11, wherein the concave blades in the rearmost row are transversely tilted at an angle in a range from about 4 degrees to about 12 degrees.

14. The apparatus according to claim 11, wherein the concave blades in the rearmost row are vertically tilted at an angle in a range from about 4 degrees to about 12 degrees.

15. The apparatus according to claim 11, wherein the concave blades in the rows forward of the rearmost row are vertically tilted at an angle in a range from about 12 degrees to about 20 degrees.

16. The apparatus according to claim 11, wherein spacing in the longitudinal direction between the rearmost row and a row adjacent the rearmost row is greater than spacing in the longitudinal direction between any pair of adjacent rows forward of the rearmost row.

17. The apparatus according to claim 11, wherein spacing between the rearmost row and the row adjacent the rearmost row is between about 1.5 and about 4 times the diameter of the concave blades, and wherein spacing between the forward adjacent pair of rows is between about 1 and about 1.5 times the diameter of the concave blades.

18. The apparatus according to claim 11, wherein adjacent columns transversely overlap.

19. The apparatus according to claim 11, wherein the concave blades of each column are evenly transversely offset from one another by an offset distance equal to a width of the column divided by the number of rows.

20. The apparatus of claim 11, wherein the tillage assemblies of the at least four transversely extending rows are individually mounted to a common frame.

* * * * *